United States Patent [19]

Jin et al.

[11] Patent Number: 6,108,470

[45] Date of Patent: Aug. 22, 2000

[54] ARTICLE COMPRISING TEMPERATURE-COMPENSATED TUNABLE GRATING AND SYSTEMS USING SUCH DEVICE

[75] Inventors: Sungho Jin, Millington; Hareesh Mavoori, Berkeley Heights, both of N.J.

[73] Assignee: Lucent Technologies Inc., Murray Hill, N.J.

[21] Appl. No.: 09/179,136

[22] Filed: Oct. 26, 1998

[51] Int. Cl.$^7$ .................................................. G02B 6/34
[52] U.S. Cl. ................................................ 385/37; 385/24
[58] Field of Search ........................................ 385/24, 37

[56] References Cited

U.S. PATENT DOCUMENTS

| | | | |
|---|---|---|---|
| 5,781,677 | 7/1998 | Jin et al. | 385/37 |
| 5,812,711 | 9/1998 | Glass et al. | 385/37 |
| 5,999,546 | 12/1999 | Espindola et al. | 372/20 |
| 5,999,671 | 12/1999 | Jin et al. | 385/37 |

*Primary Examiner*—Hung N. Ngo
*Attorney, Agent, or Firm*—Mathews, Collins, Shepherd & Gould, P.A.

[57] ABSTRACT

A temperature-compensated tunable optical waveguide grating device comprises a length of optical waveguide grating including an optical grating region, a guiding tube or frame mechanically coupled to the waveguide at one end of the grating region, and mechanically coupled to the waveguide at the other end of the grating region, a movable element responsive to control signals for applying adjustable strain across the grating region, thereby tuning the grating. The device further comprises a temperature-compensating element for modulating the strain in proportion to changes in temperature, thereby temperature compensating the device. Advantageously the waveguide is an optical fiber and the movable element is a movable magnet.

The inventive device can reduce the temperature-dependent wavelength change to less than 0.5 nm/100 deg. C., and advantageously less than 0.05 nm/100 deg. C. In an advantageous embodiment, the packaging assembly also includes a fine wavelength-adjusting mechanism for post-assembly corrective tuning. The device is especially useful in WDM communication systems, particularly for adding or dropping channels, for dynamically gain-equalizing optical amplifiers and for dispersion compensation.

12 Claims, 7 Drawing Sheets

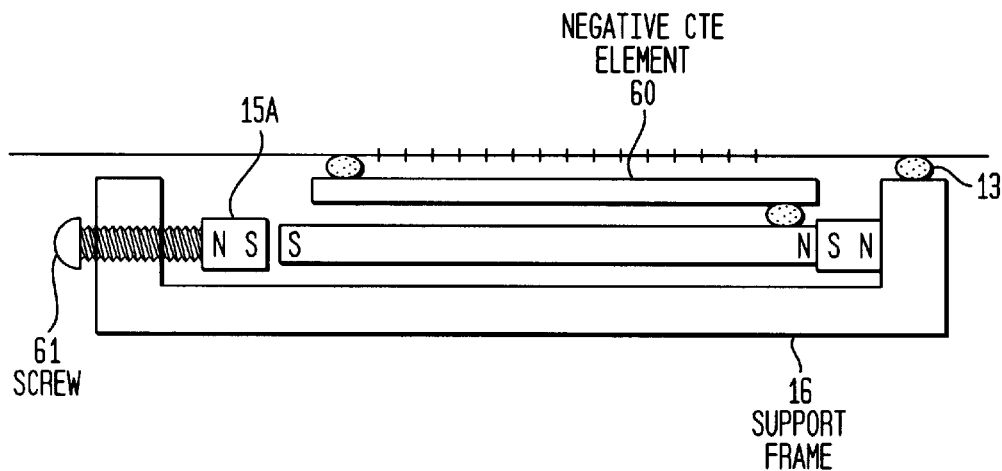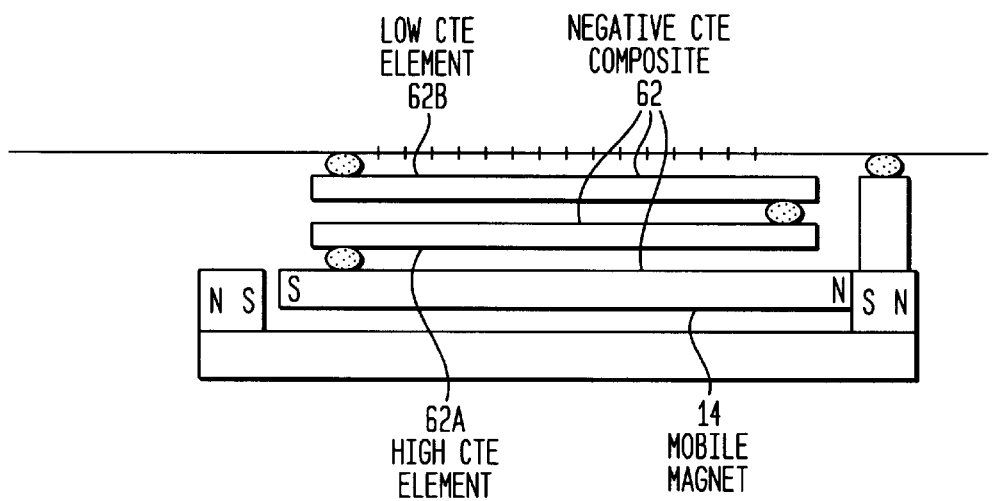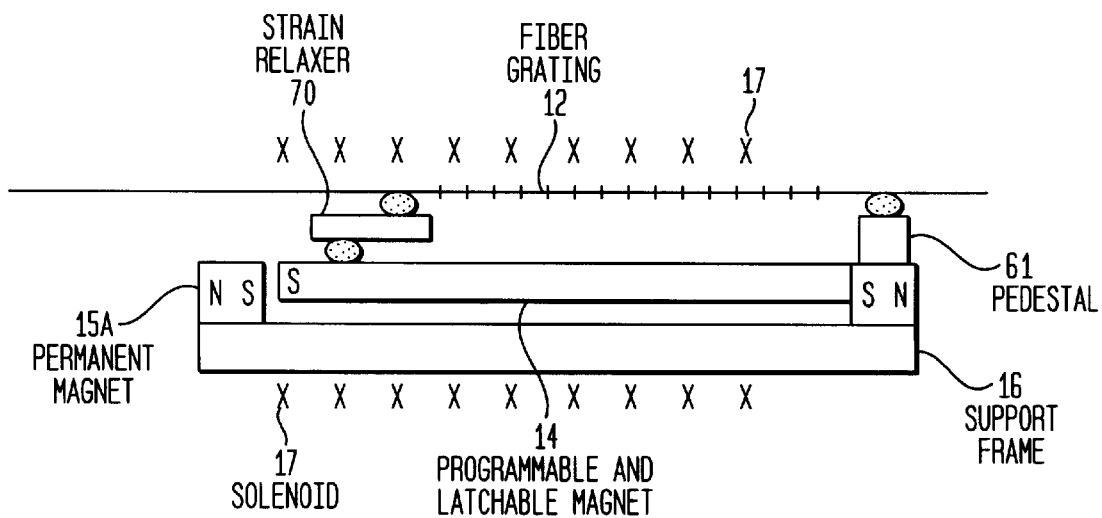

ARTICLE COMPRISING TEMPERATURE-COMPENSATED TUNABLE GRATING AND SYSTEMS USING SUCH DEVICE

FIELD OF THE INVENTION

The present invention relates to wavelength-reconfigurable optical grating devices and to communication systems using them. In particular, it concerns devices packaged such that the resonant wavelength of the grating is substantially temperature-independent.

BACKGROUND OF THE INVENTION

Optical fiber gratings are the key components in modern telecommunication systems. Optical fibers are thin strands of glass capable of transmitting an optical signal containing a large amount of information over long distances with very low loss. It is a small diameter waveguide comprising a core having a first index of refraction surrounded by a cladding having a second (lower) index of refraction. Typical optical fibers are made of high purity silica with minor concentrations of dopants to control the index of refraction.

Optical fiber gratings are important elements for selectively controlling specific wave-lengths of light within optical fiber communication systems. Gratings are used in controlling the paths or properties of light traveling within the fibers. Such gratings include Bragg gratings and long period gratings. Gratings typically comprise a body of material and a plurality of substantially equally spaced grating elements such as index perturbations, slits or grooves.

A typical Bragg grating comprises a length of optical waveguide, such as optical fiber, including a plurality of perturbations in the index of refraction substantially equally spaced along the waveguide length. These perturbations selectively reflect light of wavelength $\lambda$ equal to twice the spacing $\Lambda$ between successive perturbations times the effective refractive index, i.e. $\lambda=2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, adding and dropping signal channels, stabilization of semiconductor lasers, reflection of fiber amplifier pump energy, and compensation for waveguide dispersion.

Waveguide Bragg gratings are conveniently fabricated by doping a waveguide core with one or more dopants sensitive to ultraviolet light, e.g. germanium or phosphorous, and exposing the waveguide at spatially periodic intervals to a high intensity ultraviolet light source. The ultra-violet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

A difficulty with conventional Bragg gratings is that they filter only a fixed wavelength. Each grating selectively reflects only light in a narrow bandwidth centered around $\lambda=2n_{eff}\Lambda$. However in many applications, such as wavelength division multiplexing (WDM), it is desirable to have a reconfigurable grating whose wavelength response can be controllably altered.

One attempt to make a tunable waveguide Bragg grating uses a piezoelectric element to strain the grating. See Quetel et al., Paper No. WF6, 1996 *Technical Digest Series,. Conf. on Optical Fiber Communication,* San Jose. Calif., Feb. 25–Mar. 1, 1996, Vol. 2, p. 120. The difficulty with this approach is that the strain produced by piezoelectric actuation is relatively small, limiting the tuning range of the device. Moreover, it requires a continuous application of electrical power with relatively high voltage, e.g., approximately 100 volts.

Long-period fiber grating devices provide wavelength dependent loss and may be used for spectral shaping. A long-period grating couples optical power between two co-propagating modes with very low back reflections. A long-period grating typically comprises a length of optical waveguide wherein a plurality of refractive index perturbations are spaced along the waveguide by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $\frac{1}{5}\Lambda'$ to $\frac{4}{5}\Lambda'$. In some applications, such as chirped gratings, the spacing $\Lambda'$ can vary along the length of the grating.

Long-period fiber gratings selectively remove light at specific wavelengths by mode conversion. The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is substantially stripped off the fiber to provide a wavelength dependent loss. Such devices are particularly useful for equalizing amplifier gain at different wavelengths of an optical communications system.

A difficulty with conventional long-period gratings, however, is that their ability to dynamically equalize amplifier gain is limited, because they filter only a fixed wavelength acting as wavelength-dependent loss elements. Each long-period grating with a given periodicity ($\Lambda'$) selectively filters light in a narrow bandwidth centered around the peak wavelength of coupling, $\lambda_p$. This wavelength is determined by $\lambda_p=(n_g-n_{ng})\cdot\Lambda'$, where $n_g$ and $n_{ng}$ are the effective indices of the core and the cladding modes, respectively. The value of $n_g$ is dependent on the core and cladding refractive index while $n_{ng}$ is dependent on core, cladding and air indices.

In the future, multi-wavelength communication systems will require reconfiguration and reallocation of wavelengths among the various nodes of a network depending on user requirements, e.g., with programmable add/drop elements. This reconfiguration will impact upon the gain of the optical amplifier. As the number of channels passing through the amplifier changes, the amplifier will start showing deleterious peaks in its gain spectrum, requiring modification of the long-period grating used to flatten the amplifier. Modifying the long-period grating implies altering either the center wavelength of the transmission spectrum or the depth of the coupling.

Thus, there is a need for reconfigurable long-period gratings whose transmission spectra can be controlled as a function of the number of channels and power levels transmitted through an amplifier. It is desirable to have reconfigurable long-period gratings which, upon activation, can be made to dynamically filter other wavelengths (i.e., besides $\lambda_p$). It is also desirable to be able to selectively filter a broad range of wavelengths. Further, reconfigurable long period gratings can be useful for suppressing amplifier spontaneous emission (ASE), and can also be used as tunable loss element for filtering out undesirable remnant signals from communication channel Add/Drop operations.

A related difficulty with conventional gratings is their temperature dependence. In the Bragg gratings, both $n_{eff}$ and $\Lambda$ are temperature dependent, with the net temperature dependence for a grating in silica-based fiber exemplarily being about +0.0115 nm/° C. for $\lambda$=1550 nm. The temperature-induced shift in the reflection wavelength typically is primarily due to the change in $n_{eff}$ with temperature. The thermal expansion-induced change in $\Lambda$ is responsible for only a small fraction of the net temperature dependence of a grating in a conventional $SiO_2$-based fiber. While such a temperature-induced wavelength shift can be avoided by operating the grating device in a constant temperature environment, it causes additional complications with a need to add an oven/refrigerator system. In addition, an accurate temperature-control and continuous use of power are called for.

U.S. Pat. No. 5,042,898 by W. W. Morey et al. discloses apparatus that can provide temperature compensation of a fiber Bragg grating. The apparatus comprises two juxtaposed compensating members that differ with respect to the coefficient of thermal expansion (CTE). Both members have a conventional positive CTE. The fiber is rigidly attached to each of the members, with the grating disposed between two attachment points. The apparatus is typically considerably longer than the grating, e.g. at least 40% longer than the grating device, thus making the temperature compensated package undesirably large. In addition, the temperature compensating packages can have a substantial variation of reflection wavelength from one package to another because of the variability in the grating periodicity as well as minute variations, during package assembly, in the degree of pre-stress applied to each grating or minute variations in the attachment locations.

In view of the foregoing, it can be seen that there is a need for compact, temperature-compensated optical gratings whose spacing can be latchably reconfigured.

SUMMARY OF THE INVENTION

In accordance with the invention, a temperature-compensated tunable optical waveguide grating device comprises a length of optical waveguide grating device including an optical grating region, a guiding tube or frame mechanically coupled to the waveguide at one end of the grating region, and mechanically coupled to the waveguide at the other end of the grating region, a movable element responsive to control signals for applying adjustable strain across the grating region, thereby tuning the grating. The device further comprises a temperature-compensating element for modulating the strain in proportion to changes in temperature, thereby temperature compensating the device. Advantageously the waveguide is an optical fiber and the movable element is a movable magnet.

The inventive device can reduce the temperature-dependent wavelength change to less than 0.5 nm/100 deg. C., and advantageously less than 0.05 nm/100 deg. C. In an advantageous embodiment, the packaging assembly also includes a fine wavelength-adjusting mechanism for post-assembly corrective tuning. The device is especially useful in WDM communication systems, particularly for adding or dropping channels, for dynamically gain-equalizing optical amplifiers and for dispersion compensation.

BRIEF DESCRIPTION OF THE DRAWINGS

The advantages, nature and additional features of the invention will appear more fully upon consideration of the illustrative embodiments described in the accompanying drawings. In the drawings:

FIGS. 6(a)–(d) show bistable, magnetically tunable grating devices using negative thermal expansion elements;

FIG. 7 illustrates bistable, magnetically tunable grating device using a positive thermal expansion element;

It is to be understood that these drawings are for purposes of illustrating the concepts of the invention and are not to scale. The same reference numerals are used to designate similar elements throughout the drawings.

DETAILED DESCRIPTION

Tunable gratings (continuous and bistable configurations) are provided with passive temperature compensation using one or more of four mechanisms: (i) attaching the fiber grating to the mobile magnet via one or more components which have CTEs specifically chosen to reduce the tensile strain in the fiber grating and to cancel out the temperature-induced increase in the resonant wavelength of the grating, (ii) the use of temperature-induced increase in the magnetic gap between mating magnetic poles, e.g., through the thermal expansion of the support frame onto which one of the magnetic components is attached, (iii) the incorporation of at least one elongated element to attach the fiber grating to the guiding tube, as an extension and a strain relaxer by utilizing its thermal expansion to reduce the thermal strain in the attached grating, and (iv) the use of temperature-induced loss in magnetic strength of the programmable magnets, either by the intrinsic thermal scattering loss or by the incorporation of a thermally expanding gap material to increase the leakage flux and reduce the magnetic flux at the magnetic pole gap, thus reducing the magnetic attractive force, and hence the magnetically-induced tensile strain in the grating. There are subtle differences in the manner in which the temperature-compensation can be achieved for the continuously-tunable and the bistable cases, with the former relying on altering of magnetic attractive force through control of gap or magnetic strength, and the latter directly relaxing the strain in the fiber. These differences will become clearer from the following descriptions.

Figure 1A:
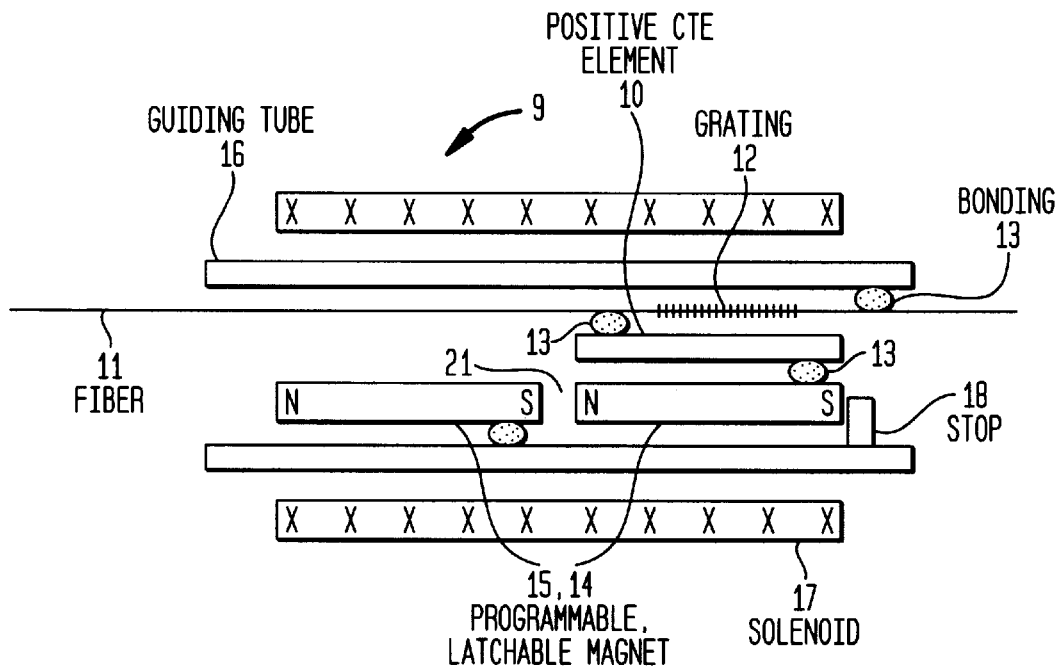
FIGS. 1(a) and (b) schematically illustrate exemplary temperature-compensated wavelength-tunable fiber grating devices.

Referring to the drawings, FIG. 1(a), schematically illustrates a continuously tunable, magnetically-reconfigurable grating device 9 which is passively temperature-compensated by a positive CTE element 10. The fiber grating device 9 comprises a length of optical fiber 11 including a grating 12 of index perturbations. The fiber in the region of the grating is secured at one end, by an intermediate positive CTE element 10 to programmable magnet 14. The other end of the grating is secured to a guiding container 16. A second magnet 15, bonded to container 16, is provided for applying to magnet 14 force which is transmitted to the grating 12. The magnets can have guided cylindrical shape, but non-round cross-sectional shapes are preferred in order to minimize fiber twisting during handling or service. One or more electromagnets (solenoids) 17 are disposed adjacent the magnets for providing a controllable magnetic field between them. The guiding container 16 is preferably a tube but can also have other configurations, such as a two-part assembly with u-shaped bottom and top pieces.

The positive CTE element 10 expands if the ambient (or operating) temperature increases. This expansion widens the gap 21 between the poles of the fixed and mobile magnets leading to a reduction in the magnetic attraction force, and thus a reduction in the tensile strain on the fiber grating. If the guiding tube (or supporting substrate) is made up of a near-zero CTE material such as Invar or quartz ($SiO_2$), then the desired CTE of the positive CTE element is chosen to preferably reduce the strain on the fiber grating by −8 to −10 ppm for every degree rise in temperature. If the guiding tube is made of a positive CTE material, its thermal expansion upon temperature rise increases the magnetic gap between the two programmable magnets because the bonding spot of the left-side immobile magnet to the guiding tube is slightly moved to the left due to the thermal-expansion-induced increase in the length of the tube to the right side of the bonding spot. This effect causes the magnetic attractive force between the magnets to be reduced, which in turn reduces the tensile strain and the grating wavelength. Thus, in the presence of some temperature-compensating effect by the positive-CTE guiding tube, the reduction in strain (with increasing temperature) imposed on the fiber grating can be less than −10 ppm/deg. C., e.g., with a value between −1 to −8 ppm/deg. C.

The guiding container 16 is typically a tube made of glass, quartz, metal or plastic. The fiber grating is attached to magnet 14 and the guiding container 16 either by mechanical clamping or by bonds 13 such as epoxy or solder. In the use of solder, the fiber surface is desirably coated with a metal layer to improve solder bond strength. Optionally, a temperature sensor can be added to control a feedback system connected to the electromagnet in order to further enhance temperature compensation.

Magnets 14, 15 are aligned with a small air gap 21 between them. They are preferably oriented so that opposite poles are adjacent (S adjacent N) and the field from electromagnet 17 will produce a tensile strain on the grating. The magnet 14 that is not bonded onto the guiding container 16 is advantageously constrained, as by a stop 18. In order to eliminate the thermal expansion related to change of the length of magnet 15 and resulting change of the gap 21, the magnet-container bonding location is chosen to be as close to the air gap as possible, with the bond-to-gap distance being less than 5% and preferably less than 2% of the magnet length.

In operation, the force transmitted from the magnets 14, 15, and 17 to the grating produces a strain which changes the wavelength response of the grating. The force between two attracting magnets is approximately proportional to the square of the magnetic induction (M) multiplied by the cross-sectional area (A) of the magnets at the gap (F $M^2 \cdot$A). Thus stronger magnets (higher M) or larger magnets (larger A) give stronger force. However, strong magnets with high coercivity are difficult to program or tune. When the fiber grating is stretched or compressed, e.g., 1% in length ($\epsilon = \Delta l/l = 0.01$), the grating periodicity Λ will also change. The resonating Bragg reflection wavelength λ will not change by exactly 1%, since the interatomic distance in the glass is also affected by the elastic strain and as a result the refractive index n is altered. This strain effect on the refractive index can be represented by a photoelastic constant $P_\epsilon$ which is typically about 0.22 for the $SiO_2$ fiber. The wavelength change induced by the magnetically applied strain $\epsilon(\epsilon = \Delta l/l)$ is thus expressed as $\Delta\lambda/\lambda = (\Delta l/l)(1-P_\epsilon(1-P_\epsilon)$. The strain 68 is determined by the applied stress (σ) and the elastic modulus (E), E=σ/E, and the stress on the fiber is the force (F) divided by the cross-sectional area ($\pi r^2$) where r is the radius of the fiber grating. Rearranging these equations, $\Delta\lambda/\lambda = (F/\pi r^2)(1/E)(1-P_\epsilon)$. For example, for λ=1550 nm, F=1200 gm gives a shift in wavelength Δλ=16.01 nm or about 1% change. For a wavelength-division-multiplex channel spacing of 0.8 nm, this induced Δλ is sufficient to alter the filtered wavelength over a 20 channel span.

Since optical fiber tends to break at a tensile strain of about 6%, and since such a failure would be disastrous, it is highly desirable to have a tunable grating design that automatically provides an upper limit in total tensile strain. The assembly configuration of FIG. 1 (a) offers such an advantage because the pre-set gap 21 between the two magnets serves as the upper limit. When the fiber is stretched by magnetic force and the magnets eventually touch each other, the tensile elongation of the fiber can not proceed. The desired width of the gap 21 (the upper limit in fiber elongation) is typically less than 4% of the length of the fiber being stretched and preferably less than 2%. For a 2" long fiber containing the grating, the gap is advantageously set below ~80 mil.

It is also important that the fiber grating is not subjected to a torsional deformation, as torsion reduces the fiber breaking strength for a given tensile strain and may distort optical signals. To eliminate or reduce torsional deformation, guiding mechanisms can be provided for the magnets, either by adding guide rails in the case of circular cross-sectioned container or by using a non-circular container. The fiber can be located either outside the magnets or within a hole in magnets.

An important advantage of the reconfigurable grating device is that continuous power is not required to maintain the induced wavelength shift. This is possible because of the latchability of magnetic force in the square loop magnets 14,15. The device can be tuned between several wavelengths. A magnetic material with strong anisotropy and an axis of magnetization aligned parallel to the optical fiber axis has a square hysteresis loop. See Jin et al., *IEEE Trans. Magn.*, MAG-23, No. 5, p. 3187 (1987), which is incorporated herein by reference. The use of deformation aged Fe—Cr—Co alloys is preferred for magnets exhibiting such a loop shape.

With magnets exhibiting a square hysteresis loop, one can make bistable strain devices that switch between two wavelengths: e.g. a zero strain Bragg reflection wavelength $\lambda_0$ and a saturation-strained reflection wavelength $\lambda_1$. $\lambda_0$ is achieved by applying an AC demagnetizing field. $\lambda_1$ is achieved by a DC pulse current sufficient to saturate the magnets. The advantage of the bis-table device is reduced sensitivity to the applied current or to stray magnetic field.

For a continuous tuning of wavelength, the square loop characteristic of fiber strain vs applied magnetic field is not always desirable as the steep side of the curve can pose a control problem when a certain intermediate strain is aimed at, e.g., for tuning over a many-channel span. For ease of controlling the strain in the fiber grating, the M—H and ε-H loop can be skewed. This is achieved by increasing the self-demagnetizing field of the magnets e.g., by either increasing the effective diameter of the magnet or reducing the length and thus decreasing the magnet length-to-diameter aspect ratio.

Since a rise in the temperature of the grating results in an increase of the Bragg wave-length $\lambda$, it is necessary to reduce the grating periodicity $\Lambda$ to compensate the effect and make $\lambda$ temperature-independent. This is accomplished by pre-stressing the fiber grating. Alternatively, the fiber is placed in a magnetically strain tuned state and then the tension in the grating is proportionally relaxed as the ambient temperature is increased (or the tension is increased as the temperature is lowered). For typical silica-based optical fiber gratings with a germanium doped core, the extent of the required thermal contraction strain upon heating for maintaining the temperature-insensitive Bragg wavelength is about $900 \times 10^{-6}$ for a temperature change of 100° C., i.e., an effective CTE of about $-9 \times 10^{-6}/°$ C.

Figure 1B:
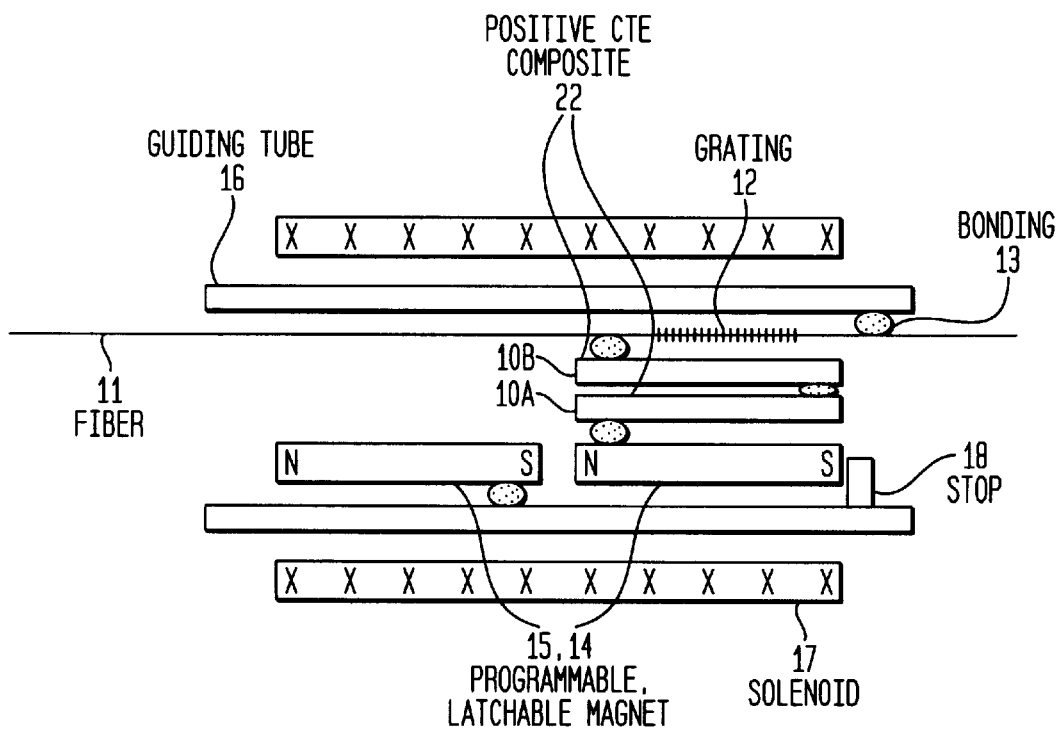

FIG. 1(b) shows an alternative embodiment of the temperature-compensated device. Here the single positive CTE element 10 of FIG. 1(a) is replaced by a composite structure 22 comprising two positive CTE elements 10A and 10B. The advantage of this differential-CTE approach is the ability to achieve effective values of CTEs that are not available in known materials. Also, the desired CTE value can be obtained by a wide choice of selection of various commercially available, low-cost metallic or non-metallic materials as well as by slightly altering the lengths of the device structure components, thereby giving greater flexibility in design. In other regards the FIG. 1(b) device operates as described for the FIG. 1(a) device.

Figure 2A:
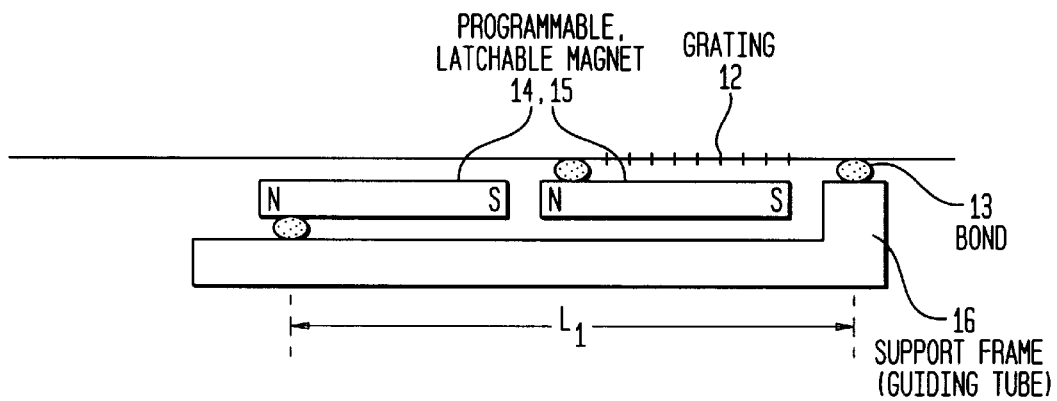
FIGS. 2(a)–(b) schematically illustrate alternative forms of the FIG. 1 devices.
Figure 2B:
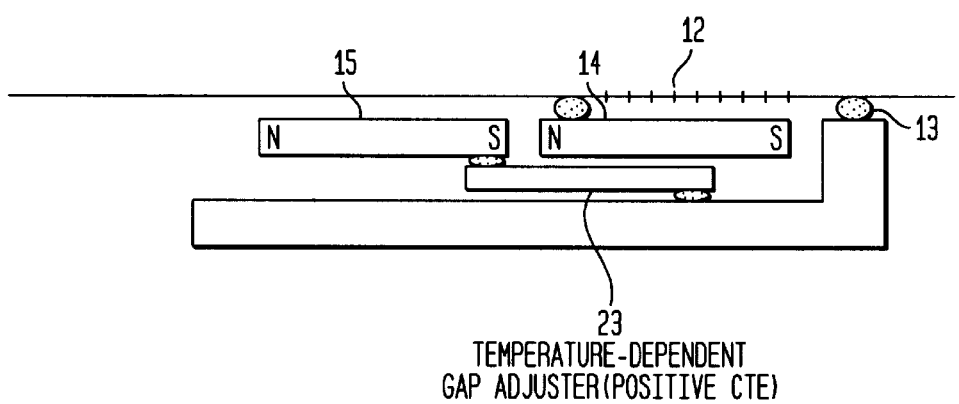

FIGS. 2(a) and 2(b) schematically illustrate devices temperature compensated by temperature-dependent control of the magnetic gap. The solenoids are not shown for clarity of illustration. Here the width of the gap 21 is controlled by temperature-controlled displacement of the fixed magnet 15. For this mechanism to be efficient, the guiding tube 16 (or support frame) is preferably made of a material with relatively large, positive CTE around 18–23 ppm/deg. C. (e.g. Al, Cu, brass, or austenitic stainless steel). As the frame length $L_1$ in FIG. 2(a) expands on heating, the gap 21 between the two programmable magnets increases, reducing the magnetic attraction force, the tensile strain in the grating and the resonant grating wavelength. The extent of such temperature- compensation can be controlled by selecting a proper length of $L_1$. Such a selection can be experimentally determined so as to induce the desired temperature-compensating effect. Alternatively, as shown in FIG. 2(b) an extension arm 23 may be added to the immobile magnet 15 as a temperature-dependent gap adjuster. This is especially useful if the guiding tube 16 must be a low CTE material. The extension arm 23 can be made of a high CTE material to provide the desired temperature-dependent, magnetic force adjusting capability.

Figure 3:
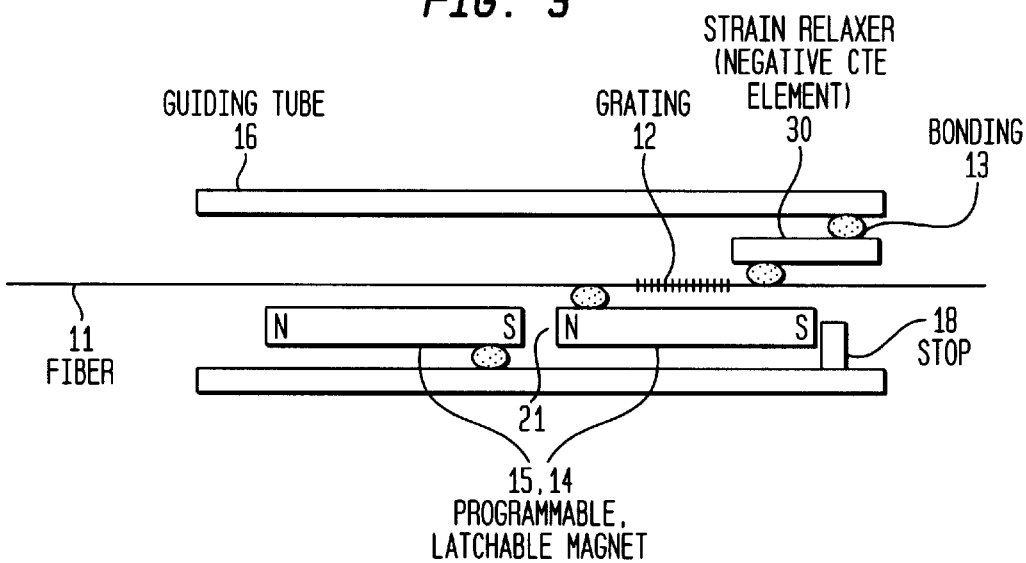
FIG. 3 shows a temperature-compensated, magnetically tunable grating device using a negative thermal expansion element.

FIG. 3 schematically illustrates a device using a temperature-compensating mechanism based on a negative CTE strain-relaxer element 30. The solenoid is not shown. Here a negative CTE element 30 (or a composite structure with a net negative CTE) is secured to the fiber grating 12. Negative CTE element 30 connects the grating to the guiding tube 16 and acts as a temperature-dependent strain relaxer. As the temperature goes up, the strain relaxer contracts, widening the gap 21 between the poles of the fixed and mobile magnets. This widening reduces the magnetic attraction force, and therefore, the tensile strain in the fiber grating. The extent of such compensation can be chosen by selecting a proper length and CTE value of the strain relaxer.

Figure 4:
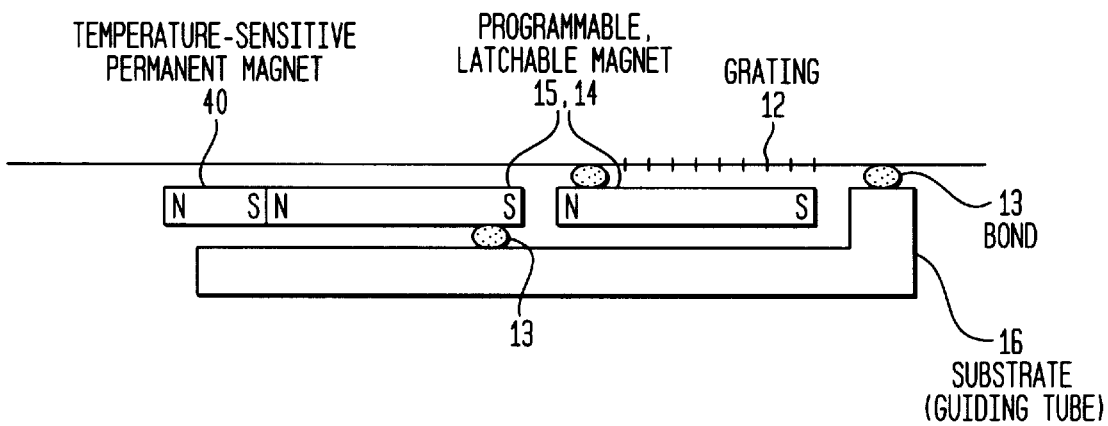
FIGS. 4 and 5 illustrate temperature-compensated, magnetically tunable grating devices using the temperature-induced decrease in magnetic force.
Figure 5:
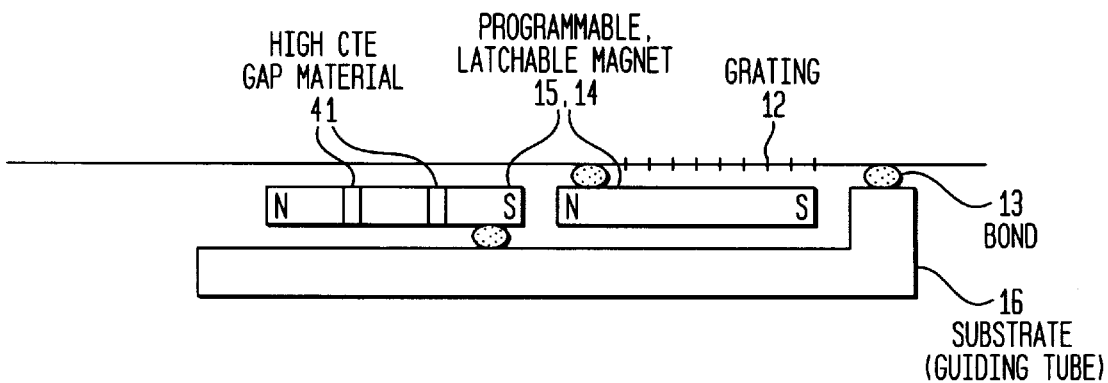

FIGS. 4 and 5 illustrate devices compensated by temperature-dependent loss of magnetic strength. The solenoids are not shown. While almost all magnet materials have some loss of their magnetization upon heating, there is a wide variation in such a temperature-sensitivity from material to material. In general, materials with high Curie temperature such as Fe- or Co- based magnets have a relatively small sensitivity while materials with relatively low Curie temperature such as barium hexaferrites or Nd—Fe—B exhibit much higher temperature sensitivity. Depending on the selection of materials, the programmable magnets 14, 15 may have sufficient temperature-dependent loss of magnet strength, or if it is not sufficient, it can be enhanced by attaching a highly temperature-sensitive magnet 40 to one of the programmable magnets 15 as illustrated in FIG. 4. Alternatively, the desired temperature-dependent loss of magnet strength at the magnetic gap can be accomplished by inserting at least one high-CTE gap material 47 (such as a polymer, epoxy, a spring which expands with increasing temperature, a bimetallic element or a shape-memory alloy) in one or both of the programmable magnets 15 as shown in FIG. 5. As the ambient temperature rises, the high-CTE gap material expands, causing more flux leakage at the gap material. The magnet strength near the facing pole area is accordingly reduced. The material and gap spacing can be chosen to compensate for the temperature effect on the grating wavelength.

These four mechanisms of passive temperature-compensation for continuously tunable gratings can be used either separately or in some combination of two or more mechanisms. These temperature-compensating mechanisms are also applicable to digitally tunable grating devices such as bistable devices.

FIGS. 6 (a)–(d) show illustrative embodiments of bistable, magnetically tunable grating structures with passive temperature-compensation.

Figure 6A:
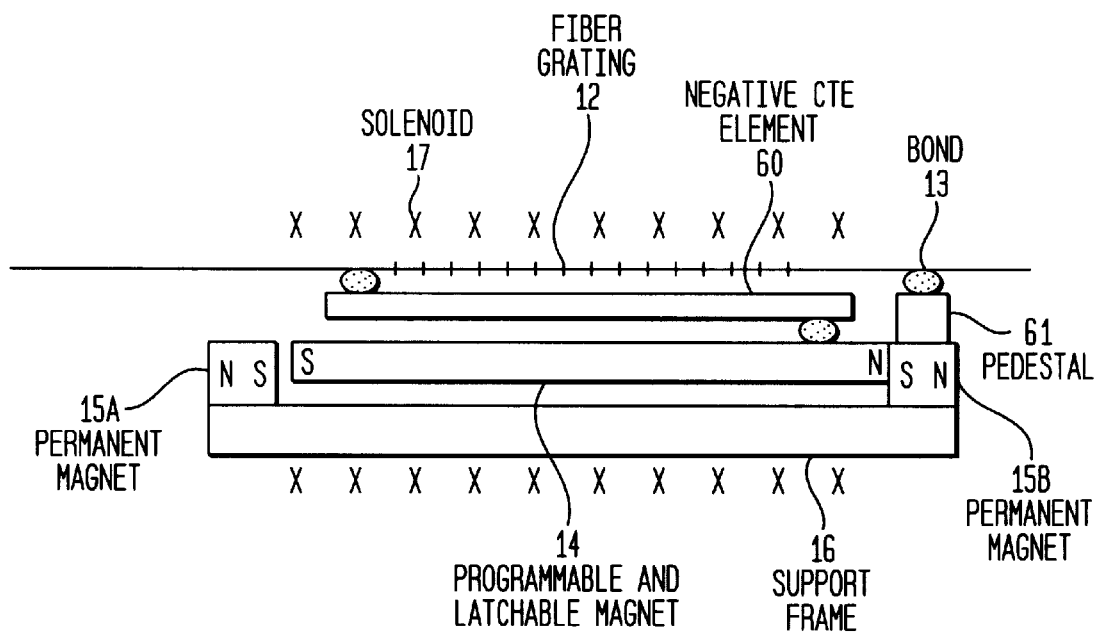
Figure 6B:
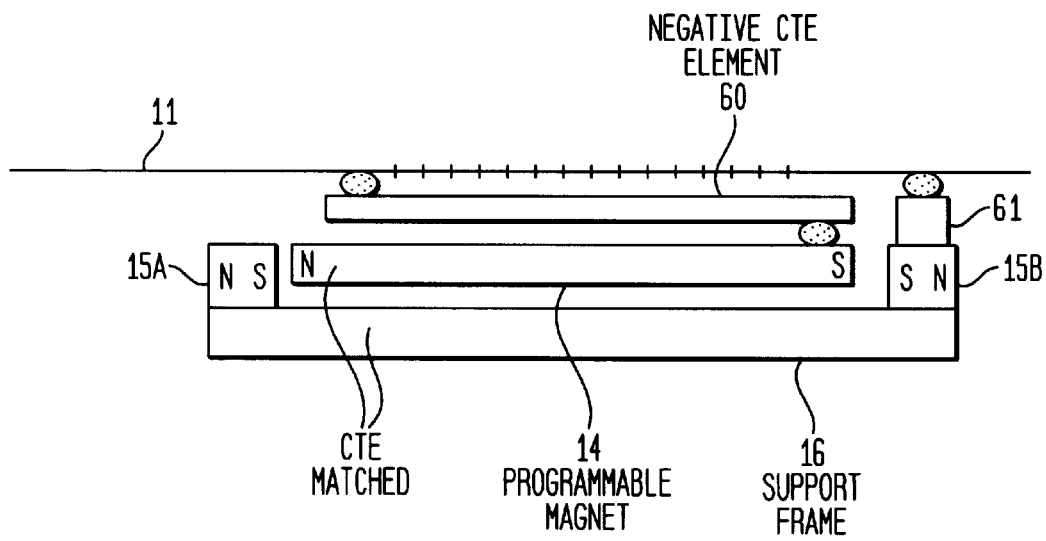

The solenoid is shown in FIG. 6(a) but similar solenoids are not shown in FIGS. 6(b) to 6(d). FIG. 6(a) schematically illustrates an exemplary digitally tunable fiber grating device 9A including a negative CTE element 60. The device 9A comprises a length of optical fiber 11 including a grating 12 of index perturbations. The fiber in the region of the grating is secured, as by bonds 13 or mechanical attachment, between a switchable magnet 14 (with an intervening negative-CTE element 60 for passive temperature compensation) and the guiding container 16 for transmitting magnetic force from the magnet 14 to the grating 12. The non-switchable magnets 15A, 15B bonded to container 16, are provided for applying attractive or repulsive force to the switchable magnet 14. The switchable magnet 14 can have guided cylindrical shape, but non-round cross-sectional shapes are preferred in order to minimize fiber twisting during handling or service. One or more electromagnets (solenoids) 17 are disposed adjacent the magnet 14 for providing a sufficient magnetic field to switch the polarity when desired. The guiding container 16 is preferably a tube but can also have other configurations. The fiber is conveniently attached to the support frame/magnet assembly via pedestal 61.

In operation, the switchable and mobile magnet 14 is attracted and clicked to either the left-side nonswitchable magnet 15A or the right-side nonswitchable magnet 15B depending on the polarity of magnetization by the surrounding solenoid 17. By virtue of the magnetic pole arrangement, the switchable magnet is repelled by one of the nonswitchable magnet while the other nonswitchable magnet attracts it. Since there are only two fixed positions of the mobile magnets, there are only two fixed states of tensile strain and hence two grating wavelength states in the attached optical fiber grating. The preset gap between the fixed magnets 15 and the mobile magnet 14 determines the degree of shift in the grating wavelength in this bistable (digitally tunable) device. An important advantage of the FIG. 6(a) device is the latchability of the shifted wavelength. After a pulse or short-duration current to the solenoid is applied for actuation, the mobile magnet is latched to one of the two positions and the electrical power is no longer needed.

In the bistable case, the temperature compensating package advantageously includes a negative CTE structure 60 or an assembled structural component whose length contracts upon heating, (a net negative coefficient of thermal expansion). Examples of negative CTE materials include ceramic materials such as $ZrP_2O_7$, $ZrV_{2-x}P_xO_7$, and $ZrW_2O_8$. See articles by C. Martinek et al., J. Am. Ceram. Soc., Vol. 51, p. 227, 1968, T. A. Mary et al., Science, Vol. 272, p. 9, 1996, and V. Korthuis et al., Chem. of Materials, Vol. 7, p. 412, 1995. Instead of ceramics, metallic negative CTE materials can be used such as Ni—Ti alloys (with 48–64 wt % Ni), Cu—Al—Zn alloys (with 1–10% Al, 20–40% Zn, bal. Cu), Cu—Al—Ni alloys (10–20% Al, 1–5% Ni, bal. Cu), Cu—Zn—Si alloys (30–40% Zn, 0.5–1.5% Si, bal. Cu), and Cu—Sn alloys (20–30% Sn, bal. Cu). The material chemistry and processing of metallic, ceramic, or composite materials can be controlled to obtain a desired level of the negative CTE.

The temperature-compensation is obtained in the following manner. When the mobile magnet 14 is switched to the right-side position against magnet 15B, the temperature effect is determined by two main factors, i.e., the temperature-induced wavelength increase in the grating and the thermal contraction of the negative-CTE element. The small distance between the two right-side bonds (consisting of a small portion of the length of the mobile magnet 14, a short length of the permanent magnet 15B and of the pedestal 61) also contributes to thermal expansion, but its effect is small, and can be easily accommodated by adjusting the length or CTE of the negative-CTE element 60. By matching the negative CTE to the desired value of about −9 ppm/deg.C., a passive temperature-compensation is realized.

If the device is now switched to the higher wavelength state shown in FIG. 6(b), the mobile magnet is magnetically attached to the left-side permanent magnet 15A. In this state, the thermal expansions of both the programmable magnet and the support frame influence the tensile strain and the grating wavelength. By using CTE-matching of the programmable magnet 14 and the support frame 16 (with a minor adjustment to accommodate other small components, length differentials etc.), the thermal expansion effects due to the zigzag-positioned programmable magnet and the support frame cancel out.

For reliable packaging of optical fiber gratings, it is important to have a capability to finely adjust ("tweak") the Bragg reflection wavelength (or the peak coupling wavelength in long-period gratings) after the packaging is nearly completed. This is because there is some grating-to-grating variation in the periodicity (Λ) and hence in the reflection wavelength, which needs to be corrected by finely adjusting the tensile strain applied to the fiber grating. In addition, there is need to correct unavoidable package-to-package variation in the amount of tensile strain applied during industrial assembly and packaging. Since the optical fiber gratings are relatively expensive, post-assembly correction and salvaging of the packaged grating is highly desirable. An additional need for fine adjustment is to apply required pre-strain on the grating after assembly instead of maintaining a constant tensile stress (stretching) during the fiber bonding processes.

FIG. 6(c) shows a temperature-compensated tunable grating device containing a mechanism for fine adjustment of the wavelength. In essence, the mechanism is a threaded screw or bolt 61 which adjusts the position of one of the permanent magnets 15A. This adjustment alters the extent of wavelength shift on switching. Such a fine wavelength adjustment can also be provided by an adjustable screw or spacer-insertion mechanism disposed between the fiber grating and the support frame.

Instead of a single negative-CTE element, a negative CTE assembly 62 comprising plural, positive- or zero-CTE materials placed in a compact zigzag configuration can replace the one negative CTE element 60. FIG. 6(d) shows a device using such an assembly 62. In the embodiment, the effective thermal contraction on heating is obtained by utilizing a differential CTE of two linear bodies 62A, 62B in a parallel configuration attached onto a third linear body (optionally and preferably the mobile magnet 14 can be used as the third linear body). These bodies can be round or rectangular rods, tubes, strips or any arbitrary shaped bars. Upon heating, the mobile magnet 14 (CTE=$\alpha_3$, length=$L_3$) expands to the left, the high CTE component 62B (CTE=$\alpha_1$, length=$L_1$) expands to the right and the low CTE component 62A (CTE=$\alpha_2$, length =$L_2$) to the left. The overall effective CTE of the composite structure, $\alpha_{overall}$ (or the CTE imposed on the fiber grating with length $L_g$) is calculated by a relationship of $\alpha_{overall} \cdot L_g = \{(\alpha_2 L_2 + \alpha_3 L_3) - \alpha_1 L_1\}$.

If the FIG. 6(d) structure is simplified by keeping the lengths of all the components the same ($L_1=L_2=L_3=L_g$), then $\alpha_{overall}=\alpha_2+\alpha_3-\alpha_1$. For example, if tungsten (W)($\alpha_1$=4.6 ppm/deg.C.) is the first low CTE component, Al ($\alpha_2$=22.4 ppm/deg.C.) is the high CTE component, and the Fe—Cr—Co magnet alloy ($\alpha_3$~9.0 ppm/deg.C.) is the other low CTE body, the $\alpha_{overall}$=4.6+9.7−22.4=−8.1 ppm/deg.C. Some examples of various materials combinations and the resultant overall CTEs are given in Table 1. The desired value of $\alpha_{overall}$ for the fiber grating can be obtained not only by the selection of suitable materials for the structure of FIG. 6(d) but also by controlling relative lengths of the high CTE body, low CTE body, programmable magnet and the fiber grating.

Table 1. Some examples of negative overall CTE obtained in the FIG. 6 (d) structure.

| Component 1 ($\alpha_1$, ppm/° C.) | Component 2 ($\alpha_2$, ppm/° C.) | Component 3 ($\alpha_3$, ppm/° C.) | $\alpha_{overall}$ (ppm/° C.) |
|---|---|---|---|
| Al ($\alpha_1$ = 22.4) | Invar ($\alpha_2$ = 0.3) | Invar ($\alpha_3$ = 0.3) | −21.8 |
| Al—Cu (22.2) | W (4.6) | Invar (0.3) | −17.3 |
| Brass (19.5) | Mo (5.1) | Invar (0.3) | −14.1 |
| 304 Stainless St. (18.1) | Invar (0.3) | Mo (5.1) | −12.7 |
| Alumel (16.7) | Invar (0.3) | Ta (6.5) | −9.9 |
| Brass (19.5) | Mo (5.1) | Mo (5.1) | −9.3 |
| Monel (14.2) | W (4.6) | Invar (0.3) | −9.3 |
| Brass (19.5) | Hf (5.9) | W (4.6) | −9.0 |

-continued

| Component 1 ($\alpha_1$, ppm/° C.) | Component 2 ($\alpha_2$, ppm/° C.) | Component 3 ($\alpha_3$, ppm/° C.) | $\alpha_{overall}$ (ppm/° C.) |
|---|---|---|---|
| Al—Cu (22.2) | W (4.6) | Ti (8.5) | −9.1 |
| Co (12.5) | Invar (0.3) | Nb (7.1) | −5.1 |
| Nichrome (13.1) | W (4.6) | Ti (8.5) | 0 |
| Fe-52Ni (10.2) | Mo (5.1) | Mo (5.1) | 0 |
| Brass (19.5) | $Al_2O_3$ (9.2) | $SiO_2$ (0.7) | −9.6 |

It should be noted that the coefficient of thermal expansion of many metals and alloys can be altered as by texture formation, cold working, and variation in alloy composition by as much as a few to several per cent. The $\alpha_{overall}$ can be altered by 0–30% through changing the relative lengths ($L_1$, $L_2$ and $L_3$).

The advantages of the temperature-compensating package according to the invention are that i) the length of the package can be compact, essentially as short as the length of the magnetically tunable grating itself, and ii) the desired negative CTE value can be obtained by a wide choice of various commercially available, low-cost metallic or non-metallic materials as well as by slightly altering the lengths of the device structure components.

The preferred materials for the programmable magnet 14 are those whose magnetic properties are modifiable by a pulse magnetic field. They can be magnetically soft materials with very low coercivity (e.g., below ~10 Oe) such as Ni—Fe based permalloys, Fe—Co based permendur type alloys, or Si-steels. However, for a latchability of shifted wavelength without a continuous use of power, semi-hard magnetic materials are preferred, for example, low-coercivity (e.g. below ~200 Oe) Fe—Cr—Co, Fe—Al—Ni—Co (Alnico), Cu—Ni—Fe (Cunife), Co—Fe—V (Vicalloy), Fe—Mn, Fe—Mn—Ni, Fe—Mo—Ni. The desired range of the coercivity for the semi-hard magnet is typically below 500 Oe and preferably below 100 Oe for the ease of polarity switching using solenoid pulse field. The coercivity is typically above 10 Oe and preferably above 30 Oe for maintaining the stability of the remanent magnetization and also for stability against demagnetization due to stray magnetic fields. For the semi-hard magnetic materials it is desirable that the switchable magnet have a relatively square magnetization hysteresis loop with the squareness ratio (remanent magnetization/saturation magnetization) of at least 0.85, preferably at least 0.90, even more preferably at least 0.95. Mechanically ductile and easily formable or machineable magnet alloys such as Fe—Cr—Co, Cu—Ni—Fe, Co—Fe—V are particularly desirable for shaping into desired rod-like geometry. Stable permanent magnets with high coercive forces (e.g., $H_c$>1000 Oe), such as Sm—Co, Nd—Fe—B or Ba-ferrite are less desirable as the programmable magnet (unless modified to exhibit lower coercive forces) because of the difficulty in switching using desirably low magnetic field.

The programmable magnet 14 is operated by adding at least one solenoid 17 around it and applying a programmed pulse or a short-duration field to switch the polarity or alter the magnitude of magnetization in the magnet. This adjustment alters the force and the strain on the fiber grating, and hence optical signal wavelength (or amplitude in the case of long period grating). The desired duration or speed of the pulse field is typically in the range of $10$–$10^{-6}$ seconds and preferably $10^{-1}$–$10^{-4}$ seconds. For a thick magnet geometry, the use of pulses that are too fast is not desirable because of the eddy current loss. The shape of the current pulse can be rectangular, rectified sinusoidal or irregular as long as the maximum field needed for the desired magnetic switching is accomplished.

FIG. 7 shows a bistable tunable device which uses a positive-CTE strain relaxer 70. Element 70 acts as an extension of the fiber grating. Relatively high CTE materials such as Al, Cu, brass or austenitic stainless steel are preferred. As the ambient temperature rises, the strain relaxer expands, reducing the tensile strain and the wavelength in the grating.

The invention is not restricted to bistable or continuously tunable devices. A tri-stable or higher-order digital tuning is also possible. The desired temperature dependence of grating wave-length in the inventive temperature-compensated device is preferably less than 0.0010 nm/deg. C., and more preferably less than 0.0003 nm/deg. C.

The temperature-compensated, magnetically tunable gratings described herein are especially useful in wavelength division multiplexed communication systems which employ multiplexer/demultiplexer devices. In such systems, a "trunk" fiber carries optical signal channels at several wavelengths $\lambda_2, \lambda_2, \ldots \lambda_n$ and it is desirable to extract a single wavelength channel from the trunk fiber or to add a single wavelength channel onto the trunk. A wide variety of such devices can be made by interconnecting optical circulators and fiber gratings. Typically the channel reflected by the grating is dropped to the trunk fiber or is added to the trunk. Gratings as described herein permit selection at the grating of which channel is dropped or added.

Figure 8:
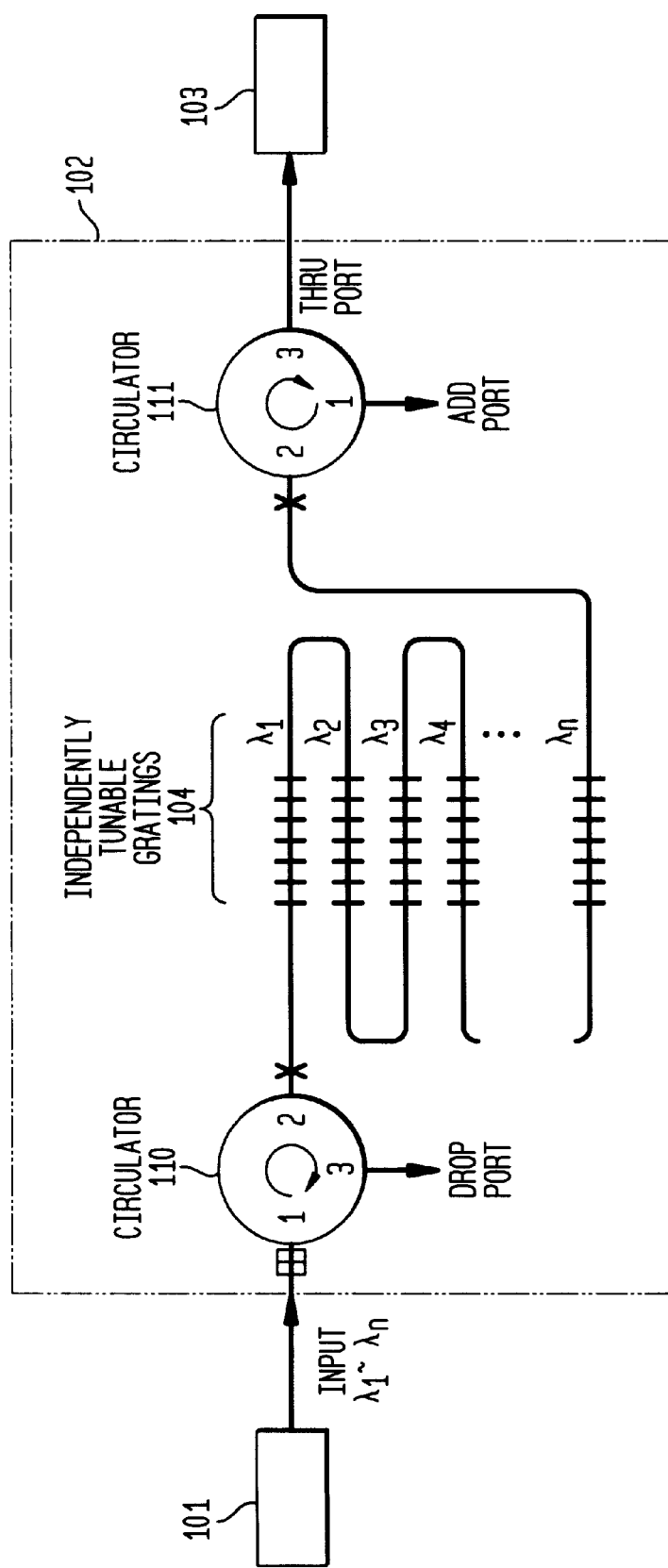
FIG. 8 shows an N channel Add/Drop WDM communication system using the temperature-compensated tunable gratings disclosed herein.

FIG. 8 schematically illustrates a wavelength division multiplexed (WDM) communications system comprising a transmitter 100, an improved N-channel multiplexer/demultiplexer 101 and a receiver 102, all connected by trunk fiber 11. The input on fiber 11 consists of optical signals at several wavelengths, $\lambda_1$ to $\lambda_n$. The multiplexer 101 is improved by the use of one or more temperature compensated tunable gratings 104 as described herein.

The multiplexer 101 comprises one or more pairs (here 1 pair) of circulators, comprising an upstream circulator 110 and a downstream circulator 111. A series of bistable tunable gratings 104 are placed between the circulators, with their grating wavelengths located at between-channel wavelengths. Actuation of desired grating for one-half channel shift in wavelength drops or adds the adjacent communication channel.

As an example, a 32-channel, reconfigurable ADD/DROP system for Wavelength Division Multiplexing can be constructed using 32 passively temperature-compensated, magnetically tunable, bistable fiber gratings connected in a series with associated circulators or directional couplers to serve as ADD or DROP ports as a schematically illustrated in FIG. 8.

The nominal (mean) wavelength of the optical signal to be processed is 1550 nm, and the signal wavelength channels are separated from one another by a spacing of 0.8 nm producing a center —to—center spacing with a channel width of 0.3 nm. The refractive index periodicity (Λ) of each grating is made into a predetermined dimension so that all 32 gratings have their Bragg reflection wavelengths off by a half channel (placed at the mid-channel positions), and hence with no tuning activated, all 32 wavelength signals pass through the ADD/DROP system without being filtered (dropped). If a certain selected group of channels needs to be dropped (or filtered), the magnetic tuning devices for those gratings are activated by a magnetic pulse field so as to strain the fiber gratings by ½ channel, e.g., $\Delta\lambda/\lambda$ of roughly 0.4 nm/1550 nm≈0.025%. To cancel the DROP operation of a channel, a reverse-polarity magnetic field (or a demagnetizing field) is applied to the magnet element to switch to the other stable position and shift back the wavelength by ½ channel. The ADD operation is performed in a similar manner but with a backward transmission through a circulator and Bragg reflection in the forward direction. The temperature-dependent shift of the grating wavelength is less than 0.0001 nm/deg.C.

The temperature-compensated, magnetically switchable fiber grating assembly also provides advantages for a variety of other optical fiber communication devices and systems. For example, a chirped Bragg grating (e.g., with a gradient periodicity covering $\lambda_1$ through $\lambda_4$ along the length of one grating, or with the four distinct grating structures written in series in one grating length) can be made magnetically switchable between two strain positions, according to the invention. In this case, the four channels are dropped or added simultaneously as a group. A plum rality of chirped gratings can be connected so that the group-wise add/drop operation of channels can be performed covering a wider bandwidth.

Figure 9:
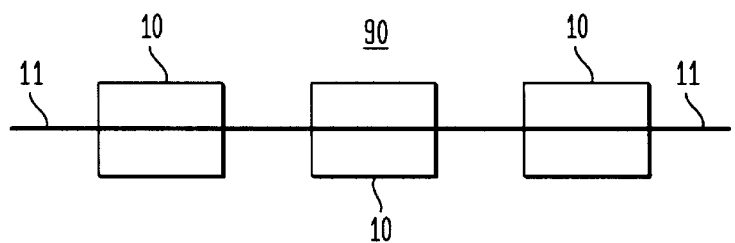
FIG. 9 illustrates a wide band tunable loss filter using one or more of the tunable gratings disclosed herein.

The passively temperature-compensated tunable grating structure according to the present invention, can also be applied to the long-period gratings for gain adjustment. As schematically illustrated in FIG. 9 tunable loss filter 90 covering a wider bandwidth than a single long-period grating device can be constructed by concatenating magnetically tunable long-period gratings 10 along a single fiber 11. A desired loss spectrum can be obtained by selectively activating the gratings.

Figure 10:
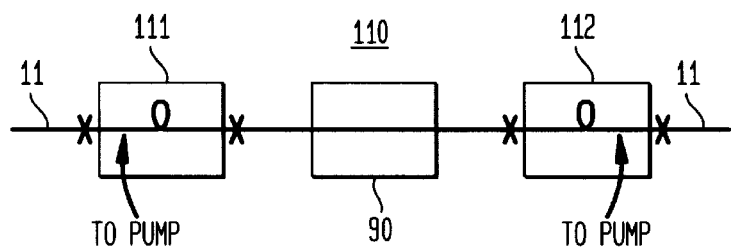
FIG. 10 shows a dynamically gain-flattened optical amplifier which can employ the loss filter of FIG. 9.

FIG. 10 illustrates a dynamically gain-flattened amplifier 110 made by including a tunable loss filter 90 composed of the temperature-compensated, tunable long-period gratings in a rare earth doped amplifier (such as an erbium-doped fiber amplifier). The amplifier 110 preferably comprises a plurality of rare-earth fiber amplifier stages (e.g. two stages 111 and 112) with the tunable loss filter 90 preferably disposed at the output of the first stage. This gives the highest power and the lowest noise figure. For applications where noise is less important, the filter 90 can be placed in front of the first stage 111. For applications where power is less important, it can be placed at the output of the last stage 112. Long-period gratings for flattening the response of an amplifier are described, for example, in U.S. Pat. No. 5,430,817 issued to A. M. Vengsarkar on Jul. 4, 1995, which is incorporated herein by reference. Such devices 110 can be advantageously used in WDM optical communication systems to ensure equalized amplification under a wide variety of conditions.

Figure 11:
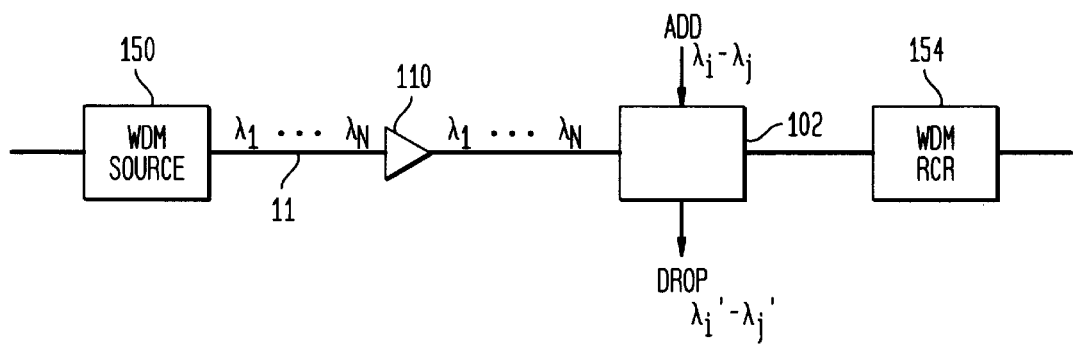
FIG. 11 schematically illustrates an optical WDM communication system which can employ the Add/Drop device of FIG. 8 and the gain-flattened amplifier of FIG. 10.

FIG. 11 schematically illustrates an optical WDM communication system comprising a source 150 of modulated WDM optical signal channels ) $\lambda_1, \lambda_2, \ldots \lambda_n$ along a trunk fiber 11. The channels pass through one or more gain equalized amplifiers 110, which can be gain flattened amplifiers as shown in FIG. 10, and through one or more ADD/DROP devices 102, which can be ADD/DROP devices as shown in FIG. 8. The signals are received at one or more WDM receivers 154.

It is to be understood that the above-described embodiments are illustrative of only a few of the many possible specific embodiments which can represent applications of the invention. The passively temperature-compensating structures and designs described here for magnetically tunable grating devices are also applicable to other non-magnetic tunable grating structures such as mechanical or piezoelectric devices. The device concept, assembly and operation method described here are also useful for making various other types of non-fiber optical gratings for the purpose of compensating for the temperature-induced effects in wavelength, amplitude or phase of optical information. For example, slitted gratings, transmission-type or reflection-type grooved gratings, or phase gratings can be made magnetically tunable and temperature-compensatable, according to the invention, for various optical applications such as for producing fresnel lenses, holographic images, and optical memory devices. Numerous and varied other arrangements can be made by those skilled in the art without departing from the spirit and scope of the invention.

What is claimed:

1. A temperature-compensated tunable optical waveguide grating device comprising:

a length of optical waveguide including an optical grating region comprising a sequence of refractive index perturbations;

a guiding tube or frame mechanically coupled to said waveguide at one end of said grating region;

a tuning device comprising a movable element mechanically coupled to said waveguide at the other end of said grating region, said movable element responsive to control signals for applying adjustable strain across said grating region, thereby tuning said grating, said tuning device further comprising a temperature compensating element for modulating the strain applied to said grating in proportion to changes in temperature, thereby temperature-compensating said tunable grating.

2. The grating device of claim 1 wherein said waveguide comprises an optical fiber.

3. The grating device of claim 1 wherein said movable element is a movable magnet.

4. The grating device of claim 1 wherein said movable element comprises a movable programmable magnet.

5. The grating device of claim 1 wherein said movable element is a movable magnet and said temperature compensating element is a length of positive CTE material mechanically coupled between said movable element and said waveguide.

6. The grating device of claim 1 wherein said tuning device comprises a movable magnet and a second magnet mechanically coupled to said tube or frame, said first and second magnets disposed with a gap between them, and said temperature compensating element comprises a length of positive CTE material for adjusting said gap in response to change in temperature.

7. The grating device of claim 6 wherein said length of positive CTE material comprises said tube or frame.

8. The grating device of claim 6 wherein said length of positive CTE material is mechanically coupled between said second magnet and said tube or frame.

9. The grating device of claim 1 wherein said tuning device comprises a movable magnet movable element and a second magnet mechanically coupled to said tube or frame, said magnets disposed with a gap between them, and said second magnet comprising a temperature sensitive magnet to act as said temperature compensating element.

10. The grating device of claim 1 wherein said movable element is a movable magnet and said temperature compensating element is a length of negative CTE material mechanically coupled between said movable magnet and said waveguide.

11. An ADD/DROP optical waveguide multiplexer comprising a grating device according to claim 1.

12. An optical waveguide amplifier comprising a grating device according to claim 1.

* * * * *